United States Patent
Segato

(10) Patent No.: US 7,775,588 B2
(45) Date of Patent: Aug. 17, 2010

(54) SEAT STRUCTURE, PARTICULARLY FOR CYCLE AND HUMAN BODY SUPPORT FRAMES

(75) Inventor: Stefano Segato, Vicenza (IT)

(73) Assignee: Selle Royal S.p.A., Pozzoleone (IT)

( * ) Notice: Subject to any disclaimer, the term of this patent is extended or adjusted under 35 U.S.C. 154(b) by 191 days.

(21) Appl. No.: 11/912,892

(22) PCT Filed: Apr. 28, 2006

(86) PCT No.: PCT/IB2006/051344

§ 371 (c)(1),
(2), (4) Date: Oct. 28, 2007

(87) PCT Pub. No.: WO2006/117742

PCT Pub. Date: Nov. 9, 2006

(65) Prior Publication Data

US 2009/0127898 A1  May 21, 2009

(30) Foreign Application Priority Data

Apr. 29, 2005 (IT) .......................... VI2005A0128

(51) Int. Cl.
*B62J 1/00* (2006.01)
(52) U.S. Cl. ........................ 297/215.14; 297/215.13; 297/215.15
(58) Field of Classification Search ............ 297/215.16, 297/215.14, 215.15, 215.13
See application file for complete search history.

(56) References Cited

U.S. PATENT DOCUMENTS

| 5,536,065 | A | * | 7/1996 | Girardi | .................. 297/215.14 |
| 6,561,578 | B1 | | 5/2003 | Mel | |
| 6,695,335 | B1 | | 2/2004 | Gaastra | |
| 2003/0090131 | A1 | | 5/2003 | Roleder et al. | |

FOREIGN PATENT DOCUMENTS

| FR | 877909 | 1/1943 |
| JP | 2004330815 | 11/2004 |

* cited by examiner

Primary Examiner—Milton Nelson, Jr.
(74) Attorney, Agent, or Firm—Themis Law

(57) ABSTRACT

The present invention finds application in the field of support structures, and particularly relates to a seat structure, particularly for cycle and human body support frames. The structure comprises a support element (2) having a lower surface (4) and an upper surface (3), the latter being designed to support at least partially the weight of a user, and anchor means (5) associated to the support element (2) for anchorage thereof to a bicycle or human body support frame (T) in a longitudinally and/or angularly and/or vertically adjustable position. The anchor means (5) include at least one longitudinal extension (6), which extends downwards from said support element (2) and has at least one substantially horizontal member (7), designed to be clamped by at least one substantially horizontal clamping member (S), which is associated to the frame (T), and acts in a substantially vertical direction.

9 Claims, 2 Drawing Sheets

SEAT STRUCTURE, PARTICULARLY FOR CYCLE AND HUMAN BODY SUPPORT FRAMES

FIELD OF THE INVENTION

The present invention finds application in the field of human body support structures, and particularly relates to a seat structure for cycle and human body support frames.

BACKGROUND OF THE INVENTION

A critical factor for bicycle seat design is known to be the ability to provide maximized comfort for the user. This is not only achieved by using a suitable saddle pad, but also by being able to adjust the seating position to best fit the rider's body conformation and his/her riding preferences.

Means are currently available for anchorage of the saddle to the seat post, which consist of rigid members, typically two metal rods, e.g. made of steel or an alloy, which are stably connected to the lower support of the saddle, and are longitudinally arranged at a proper distance from each other. These rods may be secured to the saddle and the seat post by various mechanical connection means, such as plates, fastened by nut and screw assemblies.

These prior art arrangements have the apparent drawback of only allowing height adjustment of the saddle by acting on the seat post only, and of not allowing appropriate positioning thereof along the longitudinal axis of the saddle. Therefore, the user is prevented from taking an optimized riding position, fitting his/her body conformation, or from changing such position as a function of the particular aerodynamic conformation to be achieved, as might be required, for instance, in descents.

In an attempt to obviate the above drawbacks, certain arrangements have been proposed, in which the lower element of the saddle is anchored to the seat post using essentially mechanical means, which allow the rods below the saddle, thence the saddle connected thereto, to slide along the longitudinal axis of the bicycle saddle.

U.S. Pat. No. 5,921,624 discloses a saddle assembly in which the lower support of the saddle is connected to the seat post by means of a tubular member which has a forked rear portion and is secured to the lower support of the saddle at three fixing points. This rail is connected to suitable fastening means that are anchored to the seat post by an assembly arrangement adapted to also allow longitudinal adjustment of the saddle.

This arrangement has the apparent drawback of not allowing quick and simple adjustment of the saddle position and of further requiring the user to perform inconvenient assembly and dismantling operations, using special tools, such as screw drivers or wrenches.

Furthermore, the tubular member, which is removably connected to the saddle support, may disengage therefrom with use.

Also, the provision of the connection assembly between the support and the tubular member undoubtedly adds bulk to the overall saddle.

U.S. Pat. No. 6,561,578, which forms the basis of the preamble of claim 1, discloses a bicycle saddle in which the connection with the seat post is achieved thanks to a single longitudinal rail, which is formed integrally with the support and is attached to the seat post by suitable horizontally acting anchor means.

In practice, this arrangement has proved to be insufficiently safe, since the horizontally acting anchor means tend to disengage relatively easily, especially after being used for a rather long time.

Moreover, the above saddle has the undoubted disadvantage of not being able to evenly and effectively support and distribute the load of the cyclist's weight, whereby excessive stresses may be exerted on specific regions of the body, particularly on the ischial region.

Furthermore, an improper distribution of the cyclist's weight may cause damages to the connection assembly, possibly leading to collapse.

Finally, a common drawback of the arrangements described above is the excessive height of the saddle—seat post assembly, which is uncomfortable and unpractical for a user. This problem is particularly felt when the seat post is a suspension seat post, in which the suspension assembly is excessively bulky.

SUMMARY OF THE INVENTION

The object of this invention is to overcome the above drawbacks, by providing a longitudinally adjustable seat structure that is highly efficient and relatively cost-effective.

A primary object of the invention is to provide a seat structure that assures stable and long-lasting positioning of the saddle, even after many hours of use.

Another object of the invention is to provide a seat structure that affords optimized load distribution, while allowing longitudinal and/or angular and/or vertical adjustment of the seat position.

Yet another object of the invention is to provide a seat structure that allows quick position adjustment, without using external tools.

A further object is to provide a seat structure that allows an even distribution of the user's body weight all over the structure.

Yet another object is to provide a seat structure that is as light and flexible as possible, while assuring an adequate resistance to stresses.

Finally, an object of the invention is to provide a seat structure that has such a configuration as to minimize the height of the assembly composed of the support member and the structure.

These and other objects, as well as other objects that will be more apparent hereafter, are fulfilled by a seat structure as defined in claim 1, which comprises a support element having a lower surface and an upper surface designed to support at least partially the weight of a user; anchor means associated to the support element for anchoring thereof to a cycle or human body support frame in a longitudinally and/or angularly and/or vertically adjustable position. The seat structure is characterized in that the anchor means comprise at least one longitudinal extension extending downwardly from the support element and having at least one substantially horizontal portion designed to be clamped by means of at least one substantially horizontal clamping member associated to the frame and acting in a substantially vertical direction.

Thanks to this particular embodiment, the seat structure of the invention provides a highly safe anchorage to the load bearing frame, even after many hours of use.

Furthermore, the structure is simply and quickly adjustable in the longitudinal and angular directions without using external tools.

Advantageously, the above extension may be formed monolithically with the support element of the structure. Thus, the overall structure will be very strong, and the risk of collapse will be minimized.

According to a preferred but non exclusive embodiment of the invention, one pair of extensions may be provided, monolithic with the support element and preferably in parallel and transversely spaced positions. These extensions will have a vertical orientation with respective outwardly extending horizontal positions.

Thanks to the latter embodiment, a seat structure with an even load distribution substantially all over the support element will be provided.

Suitably, the horizontal portions may have a respective top surface inclined at a predetermined angle. Furthermore, they may have enlarged upper edges, preferably in parallel and coplanar positions.

Thus, the horizontal portions will define respective longitudinal receptacles for the frame clamping means. A substantially vertical vincular reaction will be thus obtained, which will afford a highly stable coupling between the structure and the frame connected therewith.

According to a last feature of the invention, the extensions may define a substantially longitudinal channel, to slideably guide a spacer member interposed between the frame clamping means.

Thanks to this feature, the structure of the invention may have a further support at its bottom to considerably increase the stability of the connection with the frame.

Furthermore, this configuration of the structure will minimize the height of the structure and support assembly.

BRIEF DESCRIPTION OF THE DRAWINGS

Further features and advantages of the invention will be more apparent from the detailed description of a preferred, non-exclusive embodiment of a seat structure according to the invention, which is described as a non-limiting example with the help of the annexed drawings, in which.

DETAILED DESCRIPTION OF A PREFERRED EMBODIMENT

Figure 1:
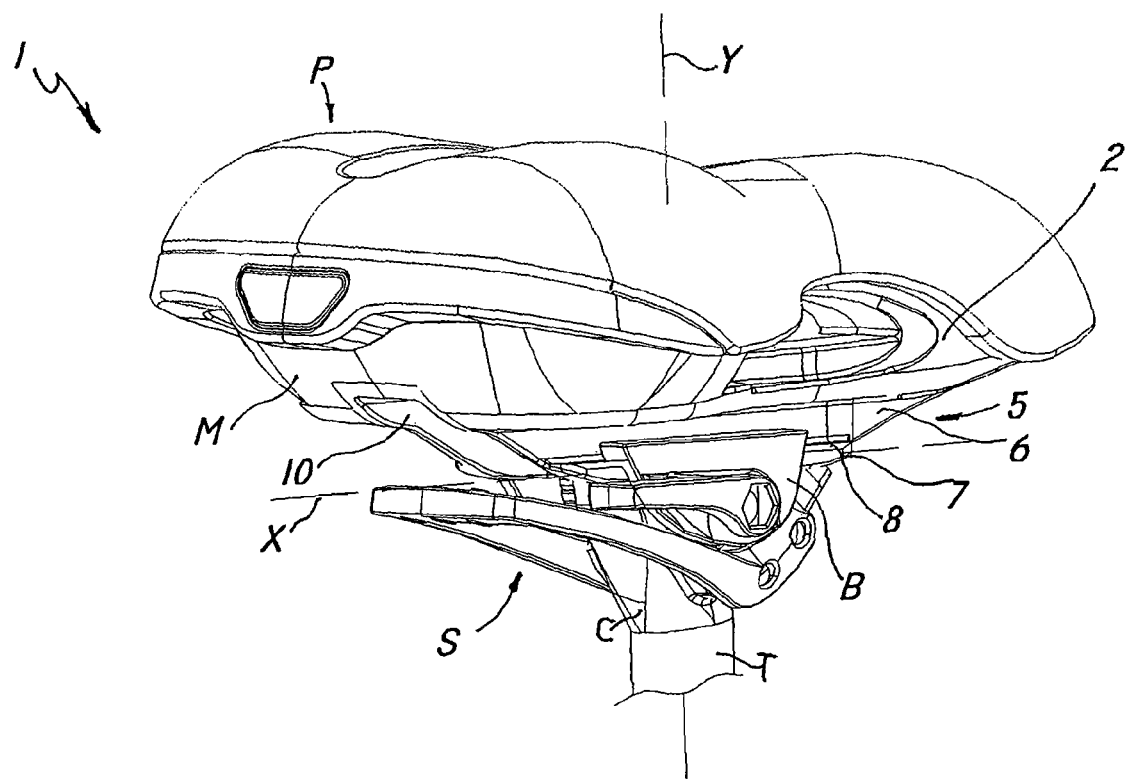
FIG. 1 is an axonometric view of a structure according to the invention.
Figure 2:
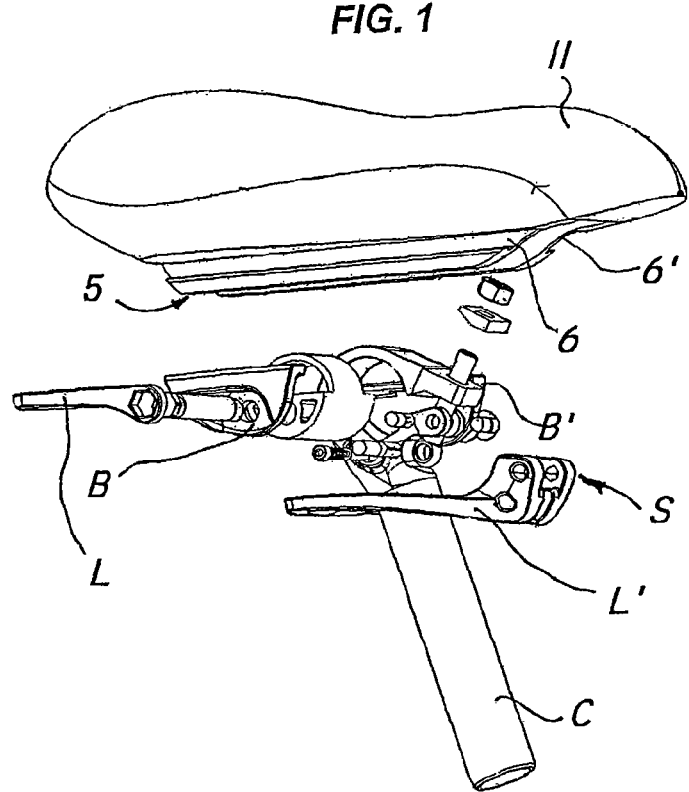
FIG. 2 is an exploded view of the structure of FIG. 1.

The seat structure of the invention may support the buttocks of a human body, and may thus be configured as a car seat, a chair or a bicycle saddle, as shown in the annexed figures.

The seat structure, generally designated with numeral 1, comprises a support element 2 having a lower surface 4 and an upper surface 3, the latter being designed to support the weight of a user. Anchor means 5 are further provided, which are secured to the support element 2 for connecting it to a bicycle frame T. According to a typical embodiment, a resilient pad 11 will be provided, which is made of foam, sponge, an elastomeric material, gel or the like, and is laid over the element 2.

According to a preferred, non exclusive embodiment of the invention, the anchor means 5 include a pair of transversely spaced extensions 6, 6', each having a horizontal portion 7, 7'.

Figure 3:
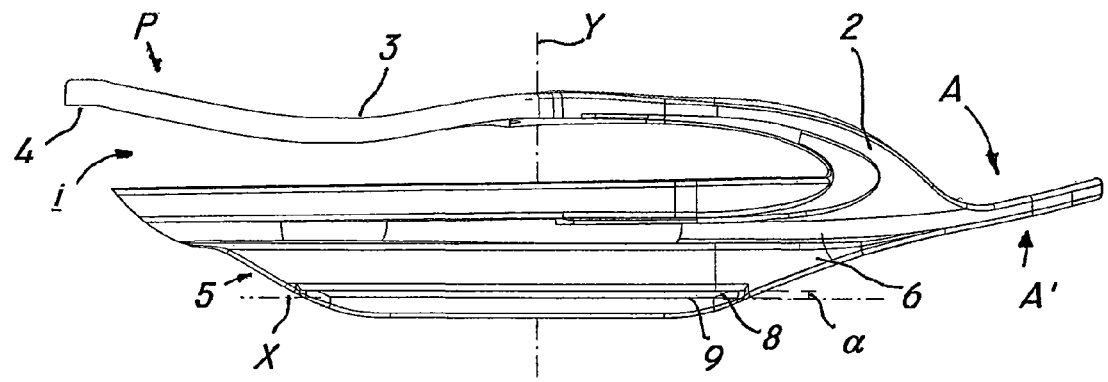
FIG. 3 is a side view of a particular embodiment of an element of the structure of FIG. 1.

The extensions 6, 6' are substantially vertical and parallel, whereas the portions 7, 7' extend outwardly for fixation to the members S for clamping the frame T, which extend in a substantially horizontal direction along the axis X, as shown in FIG. 3.

Therefore, the connection relationship between the horizontal portions 7, 7' and the clamping members S will extend in a substantially vertical direction, along the axis Y.

For easy adjustment of the longitudinal position of the structure with respect to the means S for clamping the frame T, the portions 7, 7' have an essentially constant cross section which will extend substantially all along their respective extensions 6, 6'.

Figure 4:
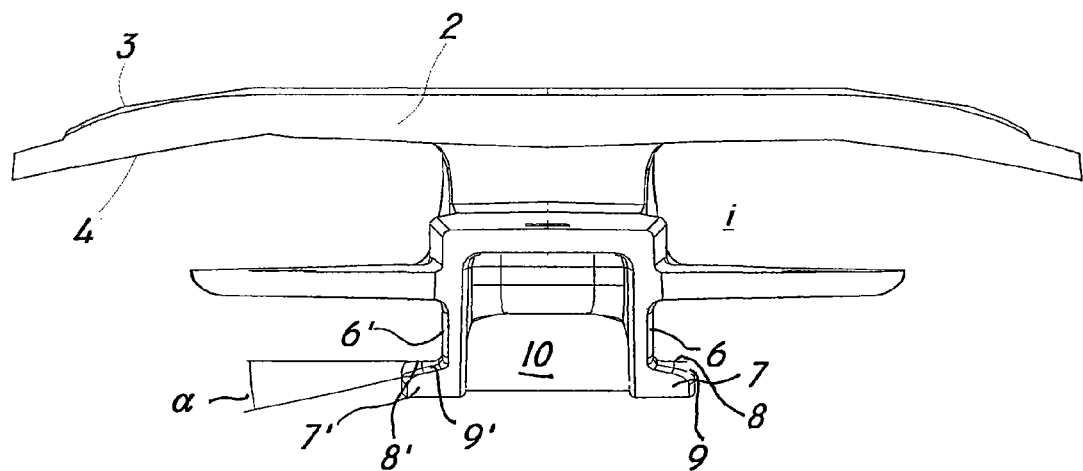
FIG. 4 is a rear view of the detail of FIG. 3.

As shown in FIGS. 3 and 4, in a particular non exclusive embodiment of the invention the support element 2 is formed separately from the means 5 for anchorage to the frame T, a gap i being formed therebetween. Such gap may possibly contain any shock absorber means M, such as common spring-type shock absorbers or elastomeric members.

Also, the seat structure is configured in such a manner as to be elongate at its front portion A and widened at the rear portion P, to best fit the seated position of the user, as in the specific case of a bicycle saddle.

Advantageously, the support element 2 and the anchor means 5 may be made of a rigid or semi-rigid material, namely reinforced metal or polymer materials such as glass fiber-reinforced polyamide 66. A number of methods, such as molding, may be used to form them. The element 2 and the means 5 shall not necessarily be made of the same material.

The extensions 6, 6' may be connected to the support element 2 by means of normal fastening means, e.g. screws or rivets, but are advantageously formed of one piece with the element 2.

The anchor means 5 are connected to the support element 2 at their respective front portions A, A'.

Conveniently, the horizontal portions 7, 7' have a top surface 8, 8' respectively, inclined at a predetermined angle α, which is not necessarily the same for both surfaces 8, 8'.

Advantageously, the latter have parallel enlarged upper edges 9, 9' to ensure safe clamping.

Suitable receptacles will be thus defined for the means S for clamping the frame T, which may be, for instance, two substantially longitudinally extending members B, B', designed to complementarily fit the horizontal portions 7, 7' of each extension 6, 6' and which may be clamped by means of two levers L, L' connected thereto.

The assembly formed by the extensions 6, 6' and the portions 7, 7' will define a substantially longitudinal channel 10, to slideably guide a suitable spacer member C interposed between the members S for clamping the frame T, such as the end portion of a seat post.

As shown above, the seat structure of the invention fulfils the intended objects, and particularly the object of assuring a stable and long-lasting positioning of the saddle, even after many hours of use.

Thanks to the provision of the horizontal portion 7, which is designed to be locked by substantially vertically acting horizontal clamping members S, the connection relationship will extend in the same direction, along the axis Y, thereby providing a highly stable and long-lasting lock.

The structure of the invention is susceptible to a number of changes and variants, within the inventive concept disclosed in the appended claims. All the details thereof may be replaced by other technically equivalent parts, and the materials may vary depending on different needs, without departure from the scope of the invention.

While the seat structure has been described with particular reference to the accompanying figures, the numerals referred to in the disclosure and claims are only used for the sake of a better intelligibility of the invention and shall not be intended to limit the claimed scope in any manner.

The invention claim is:

1. A seat structure, comprising:
   a support element (2) having a lower surface (4) and an upper surface (3), said upper surface (3) being designed to support at least partially the weight of a user;
   anchor means (5) associated to said support element (2) for anchoring thereof to a cycle or human body support frame (T) in one or more of a longitudinally, angularly, or vertically adjustable position;
   said anchor means (5) and said support element (2) being connected at their respective front portions (A, A') to define a gap (i) therebetween;
   said seat structure further comprising clamping members (S) associatable with said support frame (T) and extending in a direction substantially parallel to a first axis (X),
   characterized in that said support element (2) has a resilient pad (11) laid thereon, said anchor means (5) comprising one pair of substantially parallel and transversely spaced longitudinal extensions (6, 6') attached to and extending from said lower surface (4) of said support element (2), said anchor means (5) further comprising one pair of longitudinal portions (7, 7') extending outwardly from said longitudinal extensions (6, 6'), said clamping members (S) acting upon said longitudinal portions (7, 7') along a second axis (Y) substantially perpendicular to said first axis (X), said first axis (X) being substantially horizontal, said longitudinal portions (7, 7') being substantially parallel to said horizontal axis (X) and said upper surface (3) of said support element (2) to allow longitudinal and horizontal adjustment of said support element with respect to said clamping members (S) independently from a vertical position of said longitudinal portions, said clamping members (S) acting upon said substantially horizontal longitudinal portions (7, 7') in a vertical direction substantially parallel to said vertical axis (Y).

2. Seat structure as claimed in claim 1, characterized in that said longitudinal extensions (6, 6') are monolithic with said support element (2).

3. Seat structure as claimed in claim 1, characterized in that said longitudinal extensions (6, 6') are connected to said support element (2) by fastening means.

4. Seat structure as claimed in claim 1, characterized in that said substantially horizontal portions (7, 7') have a substantially constant cross section, in such a manner to adjust their longitudinal position with respect to said clamping members (S).

5. Seat structure as claimed in claim 1, characterized in that said longitudinal extensions (6, 6') are substantially vertical and parallel.

6. Seat structure as claimed in claim 1, characterized in that said substantially horizontal portions (7, 7') have a top surface (8, 8') inclined with a predetermined angle (a).

7. Seat structure as claimed in claim 1, characterized in that said substantially horizontal portions (7, 7') have enlarged upper edges (9, 9') in correspondence of the connection with said longitudinal extensions (6, 6').

8. Seat structure as claimed in claim 7, characterized in that said enlarged edges (9, 9') of said substantially horizontal portions (7, 7') are substantially parallel.

9. Seat structure as claimed in claim 1, characterized in that said substantially horizontal portions (7, 7') define with said substantially parallel extensions (6, 6') a substantially longitudinal channel (10) designed to slidably guide a spacer member (C) interposed between said clamping members (S).

* * * * *